United States Patent Office 2,712,497
Patented July 5, 1955

2,712,497

JET ENGINE FUEL

Homer M. Fox and Sylvester C. Britton, Bartlesville, Okla., assignors to Phillips Petroleum Company, a corporation of Delaware No Drawing. Application October 28, 1949, Serial No. 124,245

14 Claims. (Cl. 52—0.5)

This invention relates to jet engine fuel. In one of its more specific aspects, it relates to a fuel for gas turbine units. In another of its more specific aspects, it relates to means for improving the operation of intermittent and continuous type jet engines.

Jet engines, which may be generally classified as aerodynamic power plants, fall specifically into three distinct categories, i. e., ram jets, turbo-jets and pulse jets. The working cycle of the ram jet and the turbo-jet is essentially the same. One distinct difference in operation, however, is apparent in the compression step. Air is jammed into the combustion zone of the turbo-jet by a gas turbine. Compression in a ram jet engine is provided by the ramming effect of the oncoming air. Compression in the pulse jet engine is obtained by the ramming effect of the oncoming air and by the intermittent explosion of fuel which causes the closure of valves upstream of the combustion zone to prevent the escape of gases through the upstream end of the engine.

Fuel which is injected into the combustion zone of the above designated jet engines may originally be ignited therein by a spark producing device, such as a conventional spark plug mounted in the wall of the combustion chamber. Additional fuel is thereafter ignited by the flame of burning fuel or by the heat from hot combustion gases remaining in the combustion zone or hot combustion chamber wall. The air and exhaust gases within the combustion zone are heated by the heat of combustion and are exhausted from the combustion zone through a rearwardly extending exhaust conduit at an exit velocity higher than the flying speed of the engine. The thrust produced thereby equals the gas mass flowing through the exhaust duct times its increase in speed, according to the law of momentum.

The gas turbine has presented combustion problems of entirely new and different natures than have been encountered in reciprocating internal combustion engines. The continuous flow combustion process of the gas turbine is aerodynamic as well as thermodynamic in nature. Combustion of fuel within the combustor of a gas turbine is affected by a change of static pressure at the combustor inlet, inlet temperature, and inlet velocity. For a particular engine, the combustor air inlet conditions of flow, pressure, and temperature will be determined by the compressor characteristics and the state of the ambient air. The fuel flow rate is generally that which is necessary to maintain the combustor exit temperature required for the particular engine operating condition. Fuel inlet temperature may be varied over a considerable range.

When the gas turbine is applied to aircraft in the form of a turbo-jet engine, one other important element affects combustion of the fuel. As the altitude at which the turbo-jet engine operates is increased, combustion efficiency decreases. Acceleration at the given altitude may cause a failure in operation of the engine because the increase in combustor air velocity more than offsets the beneficial effects of increased combustor inlet air temperature and pressure.

It was heretofore believed that hydrocarbons do not vary sufficiently in their burning characteristics to make a material difference in the operation of any given jet engine. For that reason, emphasis has been placed on research to determine the design of a jet engine which would have such a structure as would overcome the operational difficulties which are inherently encountered in jet engines. So far, inherent operational difficulties have been only partially overcome by engine design.

A conventional turbo-jet engine comprises three main parts. One of those parts is a compressor. In the compressor, kinetic energy is imparted to the air stream and is transformed in a diffuser into potential energy as measured by an increase in static pressure in the compressor. The second part, a combustor, is provided to receive incoming air and fuel which is burned therein to increase the temperature of the air at substantially constant pressure and resulting combustion gases within the combustor. The third part, a turbine, is ordinarily provided downstream of the combustor and receives gases from the combustion chamber. The gas-turbine unit in the turbine receives the gases from the combustor and develops only enough power to drive the compressor. Forward thrust for the turbo-jet engine is provided by the high-velocity jet of gas which emerges from the turbine.

Performance of a turbo-jet engine is dependent to a large extent upon the "temperature rise" which is obtainable in the engine. "Temperature rise" is that increase in temperature between the inlet to the combustor and the temperature of the gases at the combustor exhaust inlet. The temperature rise must be carefully controlled, however, for the operation of a turbo-jet engine is limited by the ability of the turbine blades to withstand high temperatures. Fuel which is supplied to the combustor is burned in the presence of supplied air and raises the temperature of the combustion gases and unused air by the heat of combustion. An excess of air is conventionally utilized to control the temperature of the gases contacting the turbine blades. The hot gases are expanded through the turbine section which provides power for the compressor. Further expansion takes place in a rearwardly extending exhaust nozzle to provide a substantial increase in gas velocity. The thrust which is produced by the engine equals the gas mass flow through the exhaust duct times its increase in speed according to the law of momentum.

A high frequency pulsation phenomenon is commonly encountered in the operation of turbo-jet engines. That high frequency pulsation phenomenon is well known by the term "resonance." "Resonance" indicates pressure or temperature fluctuations within the burning fuel charge and is ordinarily accompanied by a decrease in "combustion efficiency." By "combustion efficiency" we mean the per cent of fuel which is completely burned to produce heat of combustion exclusive of that which is decomposed by the heat of combustion of other portions of the fuel. When resonance occurs and combustion efficiency decreases, the temperature rise through the combustion attains a maximum value which is ordinarily less than would be attained at high combustion efficiencies. Usually the flame front tends to fluctuate back and forth in the combustion chamber. As the altitude at which a turbo-jet engine operates is increased, the maximum temperature rise which is obtainable and the fuel-air ratio at which the maximum temperature rise is obtained decreases. The flame front within the combustor tends to fluctuate back and forth. Such movement of the flame front is better known as "cycling." Instability of combustion finally reaches such a state that the flame is extinguished. The point at which combustion will no longer be sustained is known as the "blow-out" or "cut-out" point. Rich-mixture blow-out is a primary controlling characteristic of turbo-jet engine performance since it defines the maximum thrust output of the engine at a given altitude. When all of the variable operating conditions with a given engine are at their worst, a critical limit will be reached above which combustion will not be maintained. That critical limit is known as a "dead band." Jet engines will, however, operate above that dead band because of more favorable conditions of one of the variables.

An object of this invention is to provide an improved fuel for jet engines. Another object of the invention is to provide an improved gas turbine fuel. Another object of the invention is to provide means to reduce cycling in continuous combustion jet engines. Another object of the invention is to provide means to reduce cycling in turbo-jet engines. Another object of the invention is to provide means to reduce resonance in turbo-jet engines. Other and further objects and advantages will be apparent to those skilled in the art upon study of the accompanying disclosure.

The assumption that all hydrocarbons burn with such a standard velocity that the operation of a jet engine is not materially affected thereby is entirely erroneous. Broadly speaking, this invention resides in a new and novel jet engine fuel which has such a combustion stability that many of the inherent operational difficulties of a jet engine are greatly reduced or are overcome to a large extent when the fuel of this invention is burned therein.

The new and novel fuel of our invention consists essentially of hydrocarbon materials and at least one gum inhibitor. The hydrocarbon fuel material comprises generally a mixture of diolefins and cycloparaffins, the cycloparaffins having more than six carbon atoms per molecule, and under some conditions a portion of cycloolefins having more than four carbon atoms per molecule. Diolefins have heretofore been deemed to be very undesirable materials for use in fuels because of their tendency to polymerize. Polymerization of the diolefin material is, however, overcome at least to a very great extent by the addition of a gum inhibitor. The gum inhibitors which are very desirable for use in this fuel comprise aromatic hydrocarbon compounds containing at least two substituent groups which are selected from the group consisting of —OH and —NH$_2$ attached to an aromatical nucleus. Gum inhibitors which are particularly suitable for use in our fuel are tertiary-butyl catechol, phenylene diamines, aminophenols, alkyl-substituted aminophenols, and aryl-substituted aminophenols.

The fuel of this invention has a boiling range within the range of between 90° F. and 500° F. The fuel contains between 5% and 50% by volume of at least one diolefin boiling within the range of between 90° F. and 500° F., between 45% and 90% by volume of at least one cycloparaffin having more than six carbon atoms per molecule and boiling below 500° F., and between 1% and 10% by volume of at least one of the above described gum inhibitors. We have found that the diolefins within the range disclosed above have combustion stability ratings which are quite good. The combustion stability ratings are based upon normal heptane which is arbitrarily rated at 100 and 2,2,4-trimethylpentane, which is assigned a rating of 0. Among the diolefin materials which are used in our fuel are 2,5-dimethyl-1,5-hexadiene, 2,5-dimethyl-2,4-hexadiene, 1,3-cyclopentadiene, 1,4-cyclohexadiene and dicyclopentadiene.

We have also found that cycloparaffins within the range described above also have very good combustion stability ratings based upon the rating of normal heptane at 100. Included within that class of materials are the following: pinane, n-propylcyclopentane, n-butylcyclopentane, isobutylcyclopentane, n-propylcyclohexane, isopropylcyclohexane, isobutylcyclohexane, and sec-butylcyclohexane.

When cycloolefins are included in the fuel, it is preferred that the fuel contain between 5% and 50% by volume of at least one diolefin boiling between 90° F. and 500° F., between 1% and 10% by volume of at least one of the above described gum inhibitors, and between 45% and 90% by volume of a mixture of at least one cycloparaffin having more than six carbon atoms per molecule and boiling below 500° F., and at least one cycloolefin having more than four carbon atoms per molecule and boiling below 500° F. Among the cycloolefins which we have found to have very good combustion stability ratings when compared with normal heptane arbitrarily rated at 100 are cyclohexene, 1-ethylcyclopentene, and α-pinene. The cycloparaffin material in the fuel is sufficient to disperse the diolefins and cycloolefins and thereby aids the gum inhibitors in preventing the polymerization of the gum-forming materials. The mixture of cycloparaffin and cycloolefin is preferably in the proportion of between 50% and 85% cycloparaffin and between 15% and 50% cycloolefin.

The representative diolefins, cycloparaffins, and cycloolefins which we have set forth above and which may be advantageously utilized in the formation of our fuel are set forth in Table I below with their respective combustion stability ratings, which ratings are based upon an arbitrary combustion stability rating of normal heptane at 100, and 2,2,4-trimethylpentane at 0.

*Table I*

| | Combustion stability rating |
|---|---|
| Diolefins: | |
| 2,5-dimethyl-1,5-hexadiene | 101 |
| 2,5-dimethyl-2,4-hexadiene | 161 |
| 1,3-cyclopentadiene | 101 |
| 1,4-cyclohexadiene | 182 |
| Dicyclopentadiene | 185 |
| Cycloparaffins: | |
| Pinane | 145 |
| n-Propylcyclopentane | 125 |
| n-Butylcyclopentane | 150 |
| Isobutylcyclopentane | 130 |
| n-Propylcyclohexane | 139 |
| Isopropylcyclohexane | 125 |
| Isobutylcyclohexane | 141 |
| Sec-butylcyclohexane | 132 |
| Cycloolefins: | |
| Cyclohexene | 126 |
| 1-ethylcyclopentene | 114 |
| α-Pinene | 155 |

Although the representative cycloparaffins do not have the exceptionally high combustion stability ratings which four of the representative diolefin materials have, the cycloparaffins nevertheless have very good stability ratings and, as discussed above, serve the purpose of being diluents for the diolefins as well as providing their own combustion stability ratings which are above average. Hydrindene in particular has an excellent combustion stability rating of 280. It is necessary that the hydrocarbon materials utilized in our fuel conform to the equation $$\frac{R-1.344}{0.00152N} \geq 1$$

where R is a refractive index at 68° F. and N is AN Performance Number, ASTM (motor) method. When the left hand member of the equation is equal to or greater than one, the Performance Number is 90 or higher.

Other hydrocarbon material classes which are advantageously used to form a portion of our fuel are aromatics, olefins, and acetylenes which conform to the equation $$\frac{R-1.344}{0.00152N} \geq 1$$

where R is refractive index at 68° F. and N is AN Performance Number, ASTM (motor) method. Aromatic hydrocarbons which exemplify the class so utilized include o-xylene, ethylbenzene, n-propylbenzene, 1-methyl-3-benzene, 1-methyl-4-ethylbenzene, n-butylbenzene, 1-methyl-4-isopropylbenzene, 1,4-diethylbenzene, 2-phenylpropene, and 1-phenyl-2-methyl-1-propene. An olefin material which exemplifies the class of materials used herein as 1-nonene. An acetylene which exemplifies the class of materials used herein is 3-heptyne.

The specific diolefin, cycloparaffin, and cycloolefin materials which have been specifically disclosed herein are merely exemplary of the general class of materials which fall within the broad disclosure of this invention. As will be evident to those skilled in the art, various modifications of this invention can be made by varying the blends of the constituent materials of the fuel. Such modifications of the invention can be made without departing from the spirit or scope of this disclosure.

We claim:

1. An improved jet engine fuel consisting essentially of hydrocarbon fuel materials and at least one aromatic hydrocarbon gum inhibitor, said hydrocarbon fuel material conforming to the equation $$\frac{R-1.344}{0.00152N} \geq 1$$

where R is refractive index at 68° F. and N is AN Performance No., ASTM (motor) method and comprising between 5% and 50% by volume of at least one diolefin boiling within the range of between 90° F. and 500° F., and between 45% and 90% by volume of at least one cycloparaffin having more than six carbon atoms per molecule, and said gum inhibitor forming between 1% and 10% by volume of the fuel having at least two substituent groups selected from the group consisting of —OH and —NH₂ attached to an aromatic nucleus, said fuel having a boiling point between 90° F. and 500° F.

2. An improved jet engine fuel consisting essentially of between 5% and 50% by volume of at least one diolefin boiling between 90° F. and 500° F.; between 1% and 10% by volume of an aromatic hydrocarbon gum inhibitor having at least two substituent groups selected from the group consisting of —OH and —NH₂ attached to an aromatic nucleus; and between 45% and 90% by volume of a mixture of at least one cycloparaffin having more than six carbon atoms per molecule and at least one cycloolefin having more than four carbon atoms per molecule, said fuel having a boiling point between 90° F. and 500° F. and the diolefin, cycloparaffin and cycloolefin constituents conforming to the equation $$\frac{R-1.344}{0.00152N} \geq 1$$

where R is refractive index at 68° F. and N is AN Performance No., ASTM (motor) method.

3. The fuel of claim 1, wherein said diolefin comprises between 5% and 30% by volume of the finished fuel.

4. The fuel of claim 1, wherein said diolefin comprises 1,4-cyclohexadiene.

5. The fuel of claim 1, wherein said diolefin comprises dicyclopentadiene.

6. The fuel of claim 1, wherein said cycloparaffin comprises isobutylcyclohexane.

7. The fuel of claim 1, wherein said cycloparaffin comprises n-butylcyclopentane.

8. The fuel of claim 1, wherein said cycloparaffin comprises n-propylcyclohexane.

9. The fuel of claim 2, wherein said cycloolefin comprises cyclohexene.

10. The fuel of claim 2, wherein said cycloolefin comprises 1-ethylcyclopentene.

11. The fuel of claim 2, wherein said cycloolefin comprises α-pinene.

12. An improved jet engine fuel consisting essentially of between 5% and 50% by volume of 1,4-cyclohexadiene; between 1% and 10% by volume of an aromatic hydrocarbon gum inhibitor having at least two substituent groups selected from the group consisting of —OH and —NH₂ attached to an aromatic nucleus; and between 45% and 90% by volume of a mixture of between 50% and 85% by volume n-butylcyclopentane and between 15% and 50% of 1-ethylcyclopentene, said fuel having a boiling point between 90° F. and 500° F.

13. An improved jet engine fuel consisting essentially of between 5% and 50% by volume of dicyclopentadiene; between 1% and 10% by volume of an aromatic hydrocarbon gum inhibitor having at least two substituent groups selected from the group consisting of —OH and —NH₂ attached to an aromatic nucleus; and between 45% and 90% by volume of a mixture of between 50% and 85% by volume n-propylcyclohexane and between 15% and 50% of α-pinene, said fuel having a boiling point between 90° F. and 500° F.

14. An improved jet engine fuel consisting essentially of hydrocarbon fuel materials and at least one aromatic hydrocarbon gum inhibitor, said hydrocarbon fuel material conforming to the equation $$\frac{R-1.344}{0.00152N} \geq 1$$

where R is a refractive index at 68° F. and N is AN Performance No., ASTM (motor) method and comprising between 5 per cent and 50 per cent by volume of at least one diolefin boiling within the range of between 90° F. and 500° F., and between 45 per cent and 90 per cent by volume of atl east one cycloparaffin having more than six carbon atoms per molecule, said gum inhibitor forming between one per cent and ten per cent by volume of the fuel and being selected from a group consisting of tertiary-butyl catechol, phenylene diamines, aminophenols, alkyl-substituted aminophenols, and aryl-substituted aminophenols, said gum inhibitor having at least two substituent groups selected from the group consisting of —OH and —NH₂ attached to an aromatic nucleus, said fuel having a boiling point between 90° F. and 500° F.

References Cited in the file of this patent

UNITED STATES PATENTS

| | | |
|---|---|---|
| 2,399,413 | Weiss et al. | Apr. 30, 1946 |
| 2,402,863 | Zuidema et al. | June 25, 1946 |
| 2,407,717 | Marschner | Sept. 17, 1946 |
| 2,445,360 | Miller | July 20, 1948 |
| 2,485,897 | Marschner | Oct. 25, 1948 |
| 2,573,471 | Malina et al. | Oct. 30, 1951 |

OTHER REFERENCES

Van Winkle, M. Aviation Gasoline Manufacture, McGraw-Hill Book Co., N. Y.—1944, pages 206 and 240.

Hackh's Chemical Dictionary, 3d edition—1944, page 559.

Journal of the American Rocket Society—No. 61, March 1945, page 5.

Murray et al., "Gas Turbine Fuels and Lubricants," Aero Digest, vol. 57, No. 1, July 1948, pages 58–60, 95, 98.

Karrer, Organic Chemistry, 4th English edition—1950, page 405, Elsevier Publishing Co., Inc., N. Y. C.